United States Patent [19]

Baumgartner et al.

[11] Patent Number: 5,535,980

[45] Date of Patent: *Jul. 16, 1996

[54] MULTILAYER INJECTION MOLD HAVING IMPROVED SURFACE PROPERTIES

[75] Inventors: Charles E. Baumgartner, Niskayona, N.Y.; Jamie M. Gutmann, Lanesboro, Mass.; Katherine D. Hamly; Matthew F. Niemeyer, both of Clifton Park, N.Y.

[73] Assignee: General Electric Company, Pittsfield, Mass.

[*] Notice: The term of this patent shall not extend beyond the expiration date of Pat. No. 5,431,367.

[21] Appl. No.: 107,863

[22] Filed: Aug. 17, 1993

Related U.S. Application Data

[63] Continuation-in-part of Ser. No. 936,464, Aug. 28, 1992, Pat. No. 5,431,367.

[51] Int. Cl.⁶ .............. B29C 33/56; B28B 7/36; B22C 1/22
[52] U.S. Cl. .............. 249/114.1; 106/38.2; 106/38.22; 428/334; 428/340; 428/364; 428/372; 428/402; 428/458; 428/473.5; 428/474.4
[58] Field of Search .................. 428/457, 458, 428/372, 402, 340, 364, 330, 323, 332, 334, 473.5, 474.4; 156/272.2, 282; 249/111, 79, 80, 134, 135, 114.1; 106/38.2, 38.22

[56] References Cited

U.S. PATENT DOCUMENTS

| | | | |
|---|---|---|---|
| 4,225,109 | 9/1980 | Yotsutsuji et al. | 249/111 |
| 4,670,479 | 6/1987 | Miyauchi | 524/154 |
| 4,734,488 | 3/1988 | Hasuo et al. | 528/196 |
| 4,774,315 | 9/1988 | Miller | 528/179 |
| 4,902,735 | 2/1990 | Okamuto, et al. | 524/151 |
| 4,977,233 | 12/1990 | Okamuto et al. | 528/198 |
| 4,983,247 | 1/1991 | Kim | 156/272.2 |
| 4,997,903 | 3/1991 | Okamuto | 528/198 |
| 5,041,247 | 8/1991 | Kim | 264/37 |

FOREIGN PATENT DOCUMENTS

| | | |
|---|---|---|
| 0489335A1 | 6/1992 | European Pat. Off. |
| 2319477 | 2/1977 | France . |
| 2151697 | 4/1972 | Germany . |
| 3137598 | 6/1983 | Germany . |
| 62-207358A | 11/1987 | Japan . |

*Primary Examiner*—Paul J. Thibodeau
*Assistant Examiner*—Stephen Sand

[57] ABSTRACT

Articles such as molds for thermoplastics, having an insulating layer preferably of resin deposited on the metal core materials, have a second layer of metal suspended in resin deposited on said insulating layer. The second layer may contain metal in platelet form as the inner mold surface, or may contain metal in fiber, whisker or irregular form with a further metal coating deposited thereon to provide resistance to abrasion. In the latter case, the adhesion of the further metal coating to the mold surface is higher than is the case if no metal-containing resin layer is present. A number of injection molding techniques utilizing the mold to produce finished parts in a variety of plastics materials are disclosed.

13 Claims, 8 Drawing Sheets

Fig. 3a
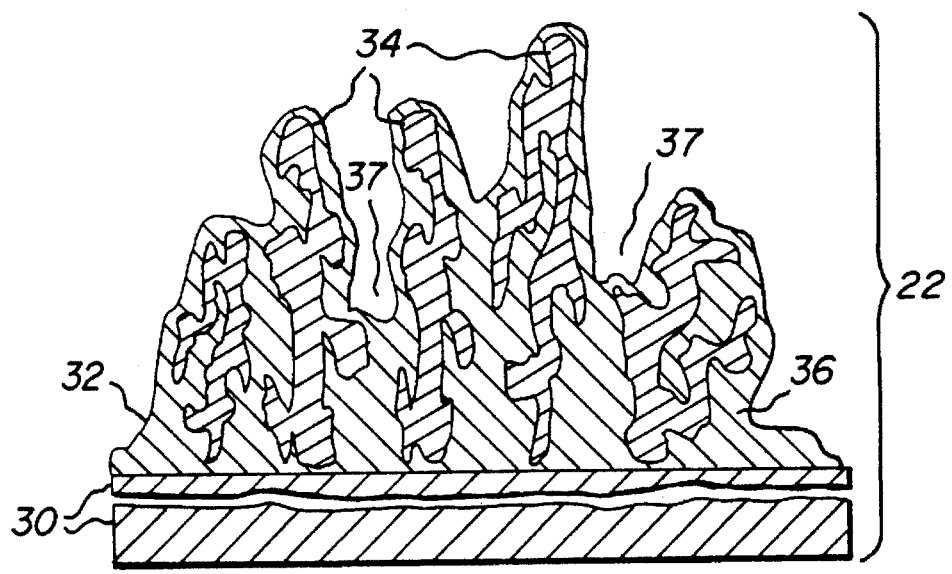
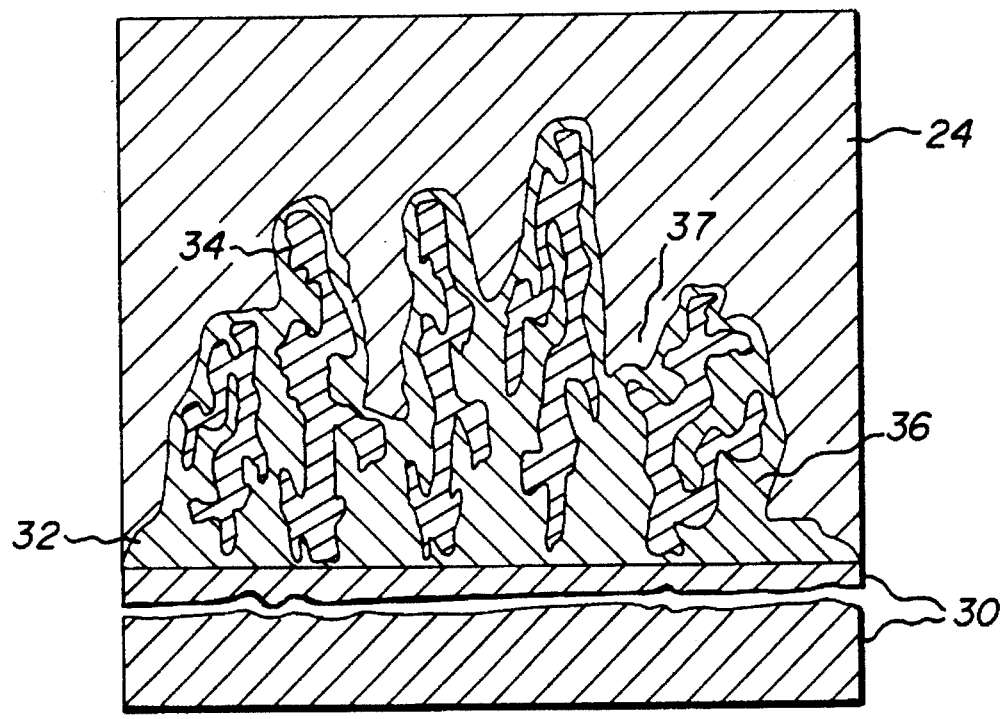
Fig. 3b

MULTILAYER INJECTION MOLD HAVING IMPROVED SURFACE PROPERTIES

This is a continuation-in-part of U.S. patent application Ser. No. 07/936,464, filed Aug. 28, 1992, now U.S. Pat. No. 5,431,367.

BACKGROUND OF THE INVENTION

This invention relates to molding of thermoplastic materials, and more particularly, to articles useful as molds for such materials and methods for molding employing such articles.

Various types of molds have long been in use for preparing shaped articles from thermoplastic resins, in such operations as blow molding, compression molding, injection molding and injection compression molding. Molds for these purposes are typically manufactured from metal or a similar material having high thermal conductivity.

Blow molding involves the extrusion of a molten tube of resin called a parison into a mold. The mold closes around the parison, pinching the bottom of the parison closed. A gas such as air is then introduced causing the tube to expand against the cool surfaces of the mold. When the parison comes into contact with the cool mold surface, the plastic at the surface quickly freezes. This results in surface imperfections such as die lines, fold lines, pores and voids.

In compression molding, composite blanks of glass reinforced thermoplastic sheets are heated. The material is heated above its melting point or if an amorphous material at least substantially above its glass transition temperature. When the composite blanks are heated, they expand (loft) due to the recoil forces within the fibers. The hot blanks are then pressed between cool mold surfaces which are below the melting point or glass transition temperature. Contact with the cool mold surfaces results in frozen resin on the surface of the blank. This creates unfilled areas in the form of exposed fibers and surface porosity. The resin at the cold surface is frozen and does not flow. Thus, rough boundaries between the charged and newly formed areas are produced.

Injection molding involves injecting molten thermoplastic resin into a mold apparatus. Molds for injection molding of thermoplastic resin are usually made from metal material such as iron, steel, stainless steel, aluminum alloy or brass. Such materials are advantageous in that they have high thermal conductivity and thus allow the melt of thermoplastic resin to cool rapidly and shorten the molding cycle time. Rapid cooling, the injected resin freezes instantaneously at the mold surface, resulting in a thin sold layer which restricts the flow of the molten material.

Rapid quenching and resulting reduced flow of the melt at the mold surface creates several problems, particularly when molding resins which contain large amounts of fillers in the form of fibers and powders. The freezing of these materials at the mold surfaces creates rough surfaces such as exposed fillers, voids and porosity. The quick solidification of the melt combined with limited flowability of the materials makes it difficult to achieve melt flow over a large area. This is especially troublesome when producing thin parts. The use of multiple gates for large and often complex mold cavities produces weld lines where flow fronts meet, which are unsightly and weak. Another important consideration in injection molding of high quality parts is the residual stresses in the molded parts. Residual stress inside a part can result in dimensional instability over the lifetime of the part. Non-uniform residual stresses are often characterized by non-uniform or severe birefringence. Dimensional stability and uniformity of refractive indices are required for high quality parts.

In injection compression molding which is a combined process, a hot thermoplastic melt is injected into a mold cavity. The parting line of the mold is positioned open or allowed to be forced open by the injected melt typically 0.05" to 0.3" inches. The clamping force is increased initiating the compression stroke of the mold forcing the melt to fill the cavity. In many instances the velocity of the melt front through the cavity changes as the injection stroke stops and the compression stroke begins. This distinct change in melt front velocity is often characterized by a stall followed by a surge in the melt front.

The melt begins to quench on the cavity walls as it is injected into the mold. As the melt front stalls, at the completion of injection, and then surges forward, upon the initiation of compression, a blemish, sometimes referred to as a halo, may be produced in the surface of the molded article. The blemish is the result of differential cooling and shear stress which occurs in the injection compression process as a result of the melt front velocity change.

There have recently been disclosed multilayer molds in which a metal core has an insulating layer bonded thereto, for the purpose of slowing the initial cooling of the resin during the molding operation. The insulating layer is fabricated of material having low thermal conductivity, thus slowing the cooling of the molten resin, and also having good resistance to high temperature degradation, permitting use in a mold maintained at high temperatures. Said layer may be made of a resin such as polyimide, polyamideimide, polyethersulfone or polyetherketone, typically applied in uncured form (e.g., as a polyamic acid in the case of a polyimide or polyamideimide) and subsequently cured. Cured resins in a solvent carrier may now be employed.

Resinous insulating layers have a major disadvantage, however, in that they are not mechanically strong and are easily abraded upon contact, for example, with filled thermoplastics. Thus, they may not have sufficient mechanical integrity to produce molded articles having surfaces of high quality.

The problem may be remedied, in part, by the application of one or more skin layers of hard material, typically metal, bonded to the insulating layer. The skin layer may be deposited by such operations as electroless deposition, electrolytic deposition and combinations thereof.

Such deposition operations introduce their own problems into the mold fabricating process. It is well known, for example, that the adhesion of metal layers to resinous substrates is poor. This fact has dictated that the resin employed in the insulating layer be one which intrinsically has or can be modified to have relatively high adhesion to metal layers deposited thereon. One genus of resins having this property is the fluorinated polyimides, of the type prepared by the reaction of pyromellitic dianhydride with 2,2-bis[4-(4-aminophenoxy)phenyl]-hexafluoropropane. Such polyimides are available from Ethyl Corporation under the trademark "EYMYD".

Fluorinated polyimides of this type may be subjected to various operations to improve their adhesion to metal. The major disadvantage in the employment of such resins and adhesion improving methods is that the resins are considerably more expensive than corresponding non-fluorinated polyimides and other resins of high thermal conductivity and stability at high temperatures. Moreover, the adhesion improving operation is an additional process step which may be burdensome and inconvenient.

A further problem is the difficulty involved in repairing a mold having a metal skin on a resin insulating layer. To repair even relatively minor damage such as one or more scratches which penetrate the metal skin, it is necessary to remove the mold from use and deposit a new metal layer thereon by further electroless or electrolytic deposition, often after removing at least the area of the old skin which surrounds the damage. Thus, the mold is out of service for a relatively long period, often several weeks.

SUMMARY OF THE INVENTION

The present invention is based on the discovery of a highly effective procedure for producing a metal surface on a layer of low thermal conductivity, typically a resin layer. This procedure may comprise one step or two steps, depending on whether the metal surface desired is merely metal-rich or is a metal skin. Said metal surface has high adhesion to the underlying resin layer. In many instances, the metal surface is also relatively easy to repair.

Accordingly, one aspect of the invention is a mold comprising:

a substrate having high thermal conductivity;

a first layer of filled or unfilled temperature-resistant material having low thermal conductivity, deposited on said substrate; and a second layer deposited on said first layer, in the form of a porous matrix comprising a suspension of metal particles in a temperature-resistant material having low thermal conductivity.

In another embodiment, which takes advantage of porous nature of the second layer, said second layer acts as a primer for a hard metal skin layer which is deposited thereon. The hard skin layer penetrates the pores and forms a good mechanical bond with the second layer.

Another aspect of the invention is a method for molding thermoplastic articles by injecting a plastic into such mold, allowing the mold to cool and ejecting the article from the mold.

The invention may also be used for other purposes. For example, devices may be fabricated into enclosures which block the passage of electromagnetic and radio frequency waves, which may cause interference. They may also be employed as parts for engines operated under high temperature conditions. Because of their predominant use in the molding of thermoplastics, however, the invention will frequently be identified with molding apparatus and method.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof may best be understood by reference to the following description taken in conjunction with the accompanying drawing figures in which:

FIG. 3A is an enlarged fragmentary drawing showing the primer layer as a matrix of metal particles in the insulation layer;

FIG. 3B is similar to FIG. 3A but shows a hard electroless plated layer disposed on the primer layer;

DESCRIPTION OF THE INVENTION

Figure 1A:
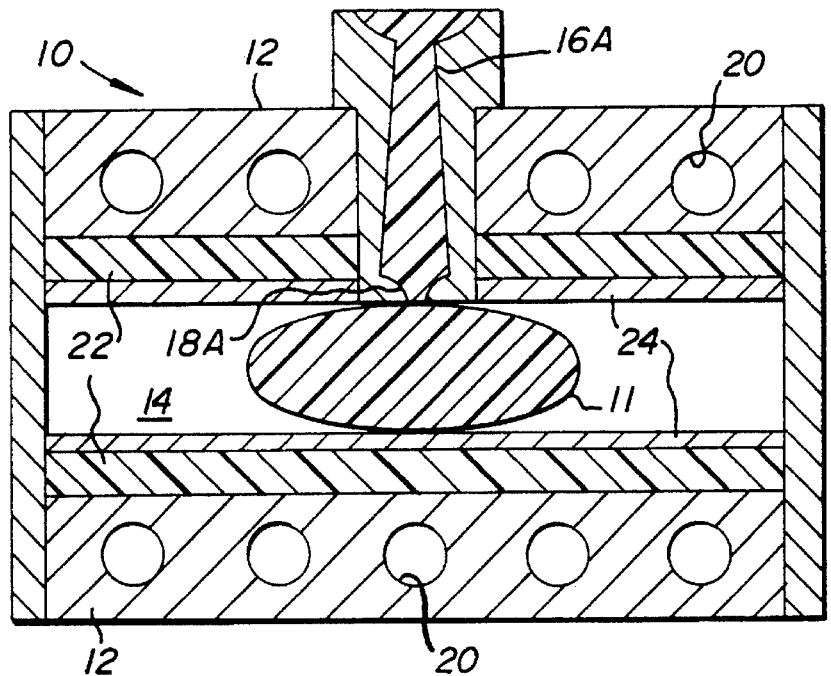
FIGS. 1A and 1B are respective fragmentary schematic end and side sectional views of an injection compression molding apparatus with one or more gates employing an insulated molds according to the invention.
Figure 1B:
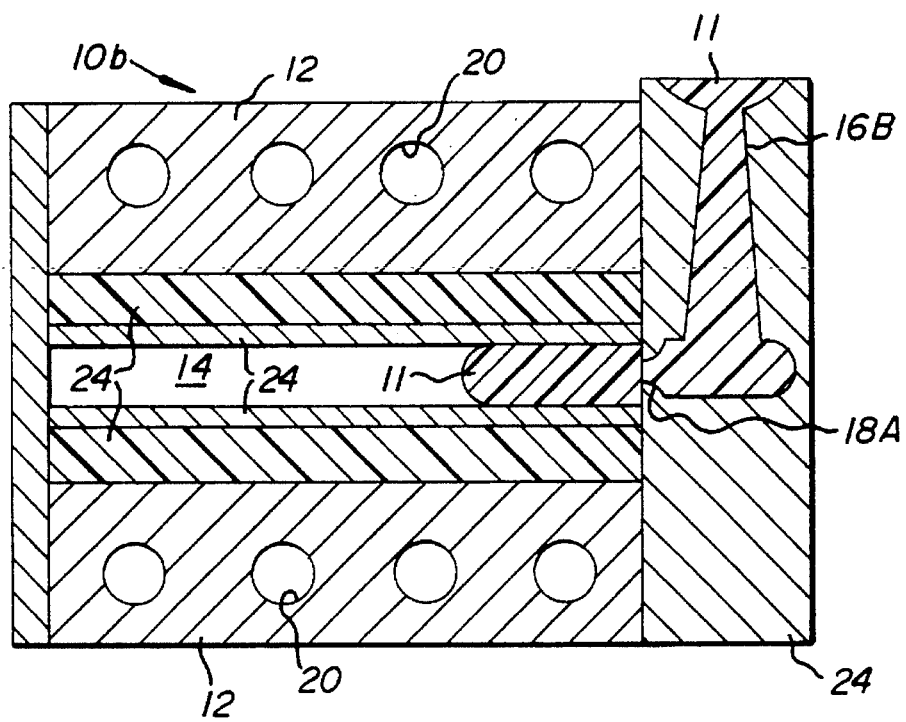

Referring now to the drawings where like numerals indicate like elements throughout. FIGS. 1A and 1B show a multilayered mold 10 of the present invention. While the attributes of the present invention are applicable to many types of molding, an injection compression molding apparatus is illustrated in the drawings. The mold 10 comprises two core halves 12 relatively moveable with respect to each other and situated in opposing or confronting relationship so as to form a mold cavity 14 therebetween. Hot thermoplastic resin 11 is injected from a source (not shown) into the mold cavity 14 via a top sprue 16A and a top gate 18A or end sprue 16B and end gate 18B, or both. After the injection step, the mold halves 12 may be moved relative to each other to further compress and spread the thermoplastic material in the cavity 14. The mold halves 12 are made of a material with a relatively high thermal conductivity such as iron, steel, stainless steel, aluminum alloy or brass. Cooling lines 20 for receiving a cooling fluid are provided in the core halves to reduce cycle time. A thermal insulating layer 22 is disposed on each of the core halves 12. The thermal insulating layer 22 is ideally made from a low thermally conductive material such as high temperature thermoplastics, thermosets, plastic composites, porous metals, ceramics and low-conductivity metal alloys.

Other low thermally conductive materials used for insulation could also be used. Further, the insulating layer 22 is made of a resin such as polyimides, polyamideimides, polyamides, polysulfone, polyethersulfone, polytetrafluoroethylene, polyetherketone, with or without fillers, typically applied in uncured form (e.g., as a polyamic acid in the case of a polyimide or polyamideimide) and subsequently heat cured. As hereinafter described, the insulating layer 22 includes a primer layer 32.

Depending on the type of insulating material selected, the insulating layer is often not sufficiently strong enough to withstand the molding process and cannot produce the desired surface quality. Therefore a hard skin layer 24 is optionally applied over the insulating layer 22 to protect the insulating layer and to provide the desired surface finish. The skin layer 24 must be made from a material which exhibits mechanical strength and abrasion resistance. The skin layer should also have a reasonably high thermal conductivity. The skin layer 24 is preferably fabricated from nickel but may also fabricated from carbon steel, stainless steel, aluminum, brass, copper, ceramics, glass, quartz, plastics and plastic composites. Metal alloys with a low thermal expansion coefficient, such as Invar ferronickel, can also be used. The skin layer 24 may be electro-deposited, or preferably electroless deposited on the insulating layer 22 as hereafter described.

In operation, as the hot thermoplastic resin 11 is injected into (and if desired, compressed in) the mold cavity 14, heat from the resin is absorbed by the skin layer 24. The insulating layer 22 not only prevents quick cooling of the resin but causes the skin layer to reheat. This results in a hot plastic surface for a short time period. The hard skin layer provides the desired surface quality to the finished part. The part is held in the mold for a time sufficient for the article to cool below the glass transition temperature of the resin, and it is then ejected from the mold.

Figure 2B:
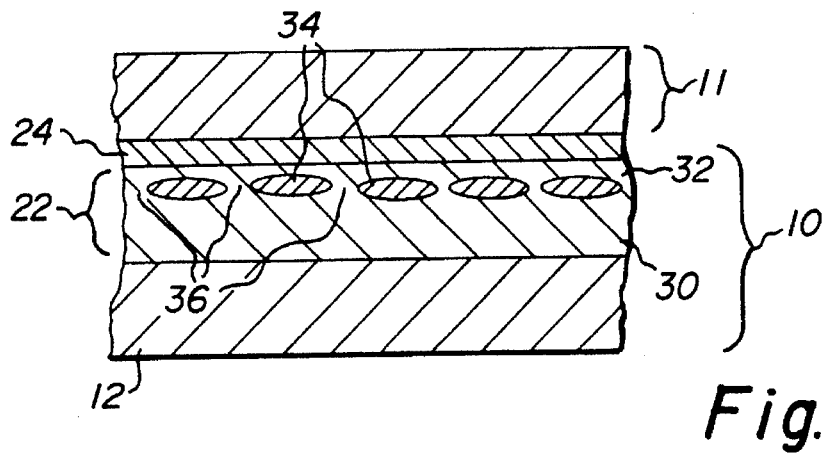
FIG. 2B is an embodiment of the invention employing an outer skin layer adhered to the primer layer illustrated in FIG. 2A.
Figure 2A:
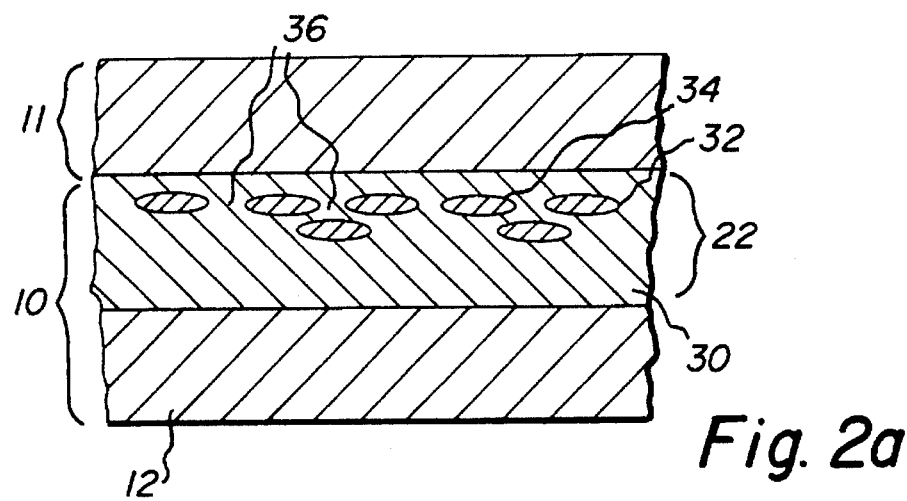
FIG. 2A is a schematic fragmentary cross-section of an insulated mold according to the present invention having a metal filled primer layer in contact with a supply of molten thermoplastic material.

FIGS. 2A and 2B are enlarged in fragmentary schematic illustrations of alternative embodiments of mold 10 in accordance with the invention in molding contact with the supply or charge of thermoplastic material 11. The mold 10 comprises the substrate in the form of the exemplary metal mold core 12 and insulating layer 22 deposited on the mold core 12. The outer hard skin layer 24, shown in FIG. 2B, may be employed as a further coating on the insulating layer 22.

In accordance with a feature of the invention, the insulating layer 22 comprises an inner layer 30 in contact with the core 12 and a composite outer or primer layer 32 atop the inner layer 30. The composite portion 32 comprises a porous matrix of particles 34 embedded in a continuous phase material 36. The particles 34 when used alone protect the continuous phase material 36. In addition, when used with the hard outer skin layer 24 (FIG. 2B), the particles 36 are preferably of the same or a similar material. The hard skin layer 24 enters the porous matrix and bonds to the metal particles 34 forming anchoring points for enhancing adhesion of the outer skin layer 24 to the insulating layer 22.

The first or inner layer 30 in the insulating layer 22 is typically a resin, i.e., a polymer of the type described herein, having low thermal conductivity and being resistant to high temperatures. Polyimides, polyamidimides, polyethersulfones and polyetherketones are illustrative. Polyimides and polyamidimides are often preferred. The layer 30 may be lightly filled with an inorganic filler (e.g., $B_aSO_4$) or quartz powder having a particle size of about 10–20 μ. The polyimide may optionally be a fluorinated polyimide to further enhance adhesion of deposited metal.

Said first layer 30 may be deposited by any of numerous art-recognized methods such as roller coating or spraying. In the case of a mold, spraying is usually preferred because of its effectiveness to coat an irregular surface uniformly. Many of the exemplary resins contemplated herein, including polyimides and polyamidimides, are cured after deposition. The thickness of the first layer is not critical but is typically in the range of about 10–500 microns.

An important feature of the invention is the outer or primer layer 32, which is the porous metal-containing composite layer deposited on said first layer 30. The continuous phase 36 of the metal-containing layer is a temperature-resistant polymer having low thermal conductivity. Said polymer is most often identical to the one employed as the first insulating layer 30. The identity of the metal particles 34 suspended in the polymer 36 is not critical so long as it is substantially resistant to oxidation under the conditions of use of the mold. Nickel is often preferred.

The shape of the metal particles 36 is also not critical. However, non-spherical particles are preferred because they promote better adhesion to the hard skin layer 24. They may be, for example, in the form of platelets, fibers or whiskers. Typical metal particle sizes are in the range of about 1–20 microns. It is preferred that the bulk density of the metal particles be below about 2 g./cc. The thickness of the second layer 32 is typically in the range of about 10–100 microns, with about 25–50 microns usually being preferred.

In one embodiment of the invention, the particle containing primer layer 32 contacts the resin 11 being molded. This embodiment is particularly useful when said resin 11 is charged to the mold at relatively low pressure, as in blow molding and low pressure injection molding, whereby the mold surface encounters relatively low friction, and when the degree of smoothness of the surface of the molded part is not critical.

The metal constituent of the primer layer 32 is most often in platelet form in this embodiment, so as to produce a relatively dense, metal-rich surface wherein the particles 34 are substantially parallel to the surface of the mold. Nickel particles in platelet form are commercially available as, for example, "Novamet HCA-1" nickel filler, a product of Novamet Products Corp.

The bulk density of the metal in platelet form is preferably in the range of about 1.1–1.5 g./cc., and the particles thereof generally have an average width on the order of 10 microns and an average thickness in the range of about 0.1–0.5 micron. Said metal is typically suspended in the resin at weight ratios of metal to resin (excluding solvent) in the range of about 0.5–5.0:1.

Conventional application methods such as those described above with reference to the first layer 30 may also be employed for the primer layer 32, with spraying generally being preferred. When necessary, said primer layer 32 is cured after application.

As shown in FIGS. 3A and 3B, the primer layer 32 is a composite in the form of a porous matrix of nickel particles 34, preferably connected in strand form, which is coated with the cured resin 26. This primer layer 32 adheres well to the inner layer 30 because both layers are coated from nearly identical solvent systems allowing good interpenetration of the resins. The Ni particles or strands 36 in the primer 32, which may comprise the majority of the layer by weight, are coated and encapsulated with the resin forming the continuous phase 36 having pores 37.

The metal surfaces provided by the invention are particularly advantageous because of the ease of repairing scratches and other minor damage therein. All that is necessary is to apply further metal-resin suspension, typically by the same application method previously employed, and to burnish or polish the resulting surface after curing of the resin if curing is necessary. The repaired surface is then suitable for continued use.

FIG. 3B illustrates the metal coating 24 deposited, for example, by electroless deposition, on to the primer layer 32. During deposition of a Ni deposit over the primer, the electroless layer 24 penetrates the pores 37 and becomes mechanically tied to the primer, as well as potentially developing metallic bonding to the exposed Ni particles 34. It can be appreciated that adhesion of the final electroless coating 24 should be influenced by conditions such as: the morphology or porosity of the primer layer (Ni type, Ni/resin ratio, resin type, and application temperature); how well the electroless Ni deposit penetrates into the porous structure (surface preparation and preplating conditions); and the primer layer integrity as well as its bonding to the insulator surface (resin section, application temperature, Ni/resin ratio). Various factors are discussed with respect to the examples hereinafter set forth.

One particular advantage of using irregular-shaped or fibrous metal particles 34 is that the resulting composite layer 32 is irregular and develops pores 37 which allow for the penetration of the metal layer 24 deeply into the matrix forming the composite layer 32. This promotes good adhesion of the metal layer 24 to the insulating layer 30. Another advantage of the fibrous metal particle 34 is that exposed surface particles in the composite layer 36 are catalytic toward electroless deposition of metals such as nickel. It may nevertheless be advantageous under some conditions to treat the surface of the second layer to further activate it catalytically. Typical treatments of this type may include abrasion to expose a maximum of metal particles and/or surfactant treatment to increase their hydrophilicity.

The whisker like particles 34 shown in FIGS. 3A and 3B have a somewhat lower bulk density than the platelet-form, typical bulk densities being in the range of about 0.4–1.0 g./cc. Filament lengths in the range of about 10–50 microns are typical. Products of this type are illustrated by "Novamet 255", "Novamet 255AC" and "Novamet 287" nickel powders. The metal in the second layer itself is porous as contrasted with the dense metal surface provided in the first embodiment. Metal to resin ratios of about 1–4:1 are preferred, since optimum adhesion of said further coating is observed in this range.

The deposition of the second layer 32 in this embodiment may be effected by the methods described hereinabove with respect to the first embodiment. Similar ratios of metal to resin may be employed. The metal coating 24 may be applied by such known methods as electroless or electrolytic deposition; electroless deposition is usually preferred for large mold surfaces, and electroplating for small surfaces.

Improved adhesion of the metal coating 24 is believed to be provided according to this embodiment by a combined mechanical and metallurgical interaction between said coating and the metal in the second layer. The second layer 32 is also electrically conductive by reason of the metal therein, facilitating, if desired, the electro deposition of further metal thereon.

Figure 4:
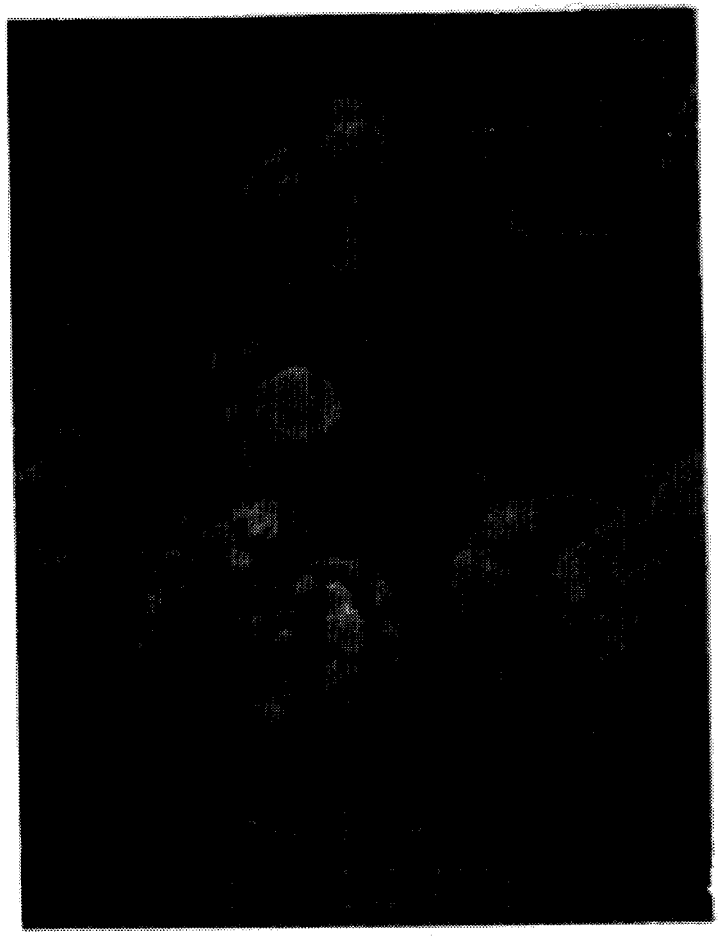
FIG. 4 is a photomicrograph of a primed mold surface fabricated with a matrix of metal particles and polymer in accordance with embodiment of FIG. 1.
Figure 5A:
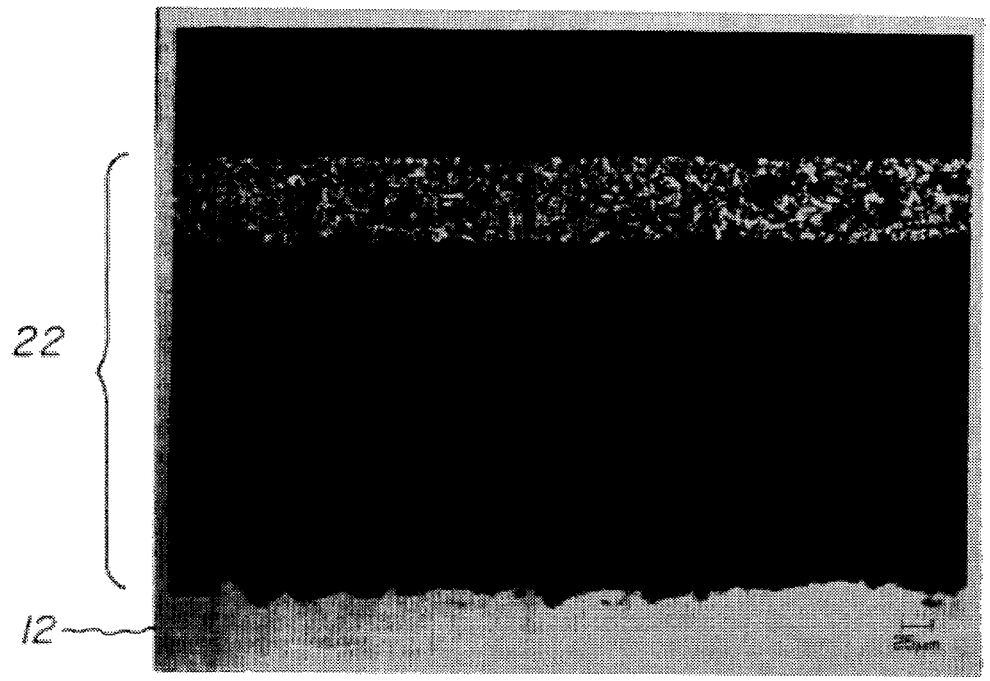
FIG. 5A is a photomicrograph, in cross-section, of a primed mold surface.
Figure 5B:
FIG. 5B is an enlarged photomicrograph, in cross-section, of a primed mold surface similar to FIG. 6A having a layer of electroless nickel deposited thereon.

FIGS. 4, 5A and 5B are photomicrographs which further illustrate the principle of the invention. FIG. 4 is a top view of the surface of the matrix containing Ni particles in EYMYD. The surface on a microscopic level appears porous. FIG. 5A is a cross-section of the nickel EYMYD layer similar to that shown in FIG. 4 which illustrates the depth of the course matrix layer 22. FIG. 5B shows an enlargement of the cross-section of FIG. 5A with a hard electroless nickel coating 24 deposited in the nickel EYMYD matrix which fills the pores. The dash line shows the approximate level of the matrix or primer layer prior to electroless nickel deposition. It can be seen that the electroless nickel deeply penetrates the primer layer thereby enhancing adhesion between the two layers. It should be noted that although the primer layer has pores on a microscopic level it is sufficiently solid and intact to act as a molding surface in those instances where a hard surface coating is unnecessary.

The invention is illustrated by the following examples. All parts and percentages are by weight unless otherwise indicated. Adhesion was measured by a test (IPC method 2.4.8) in which strips of tape, 3.2 mm. wide, are used to mask portions of a metallized surface after deposition of electrolytic copper and the exposed copper is etched away with concentrated nitric acid. The substrate is rinsed thoroughly in water, after which the tape is removed and the remaining copper strips subjected to a 90° peel test.

EXAMPLE 1

A stainless steel plaque was employed to emulate the surface of a mold. It was abraded by grit blasting, washed with water and dried. Its surface was then sprayed with a 6% solution of "EYMYD" polyimide precursor in a mixture of N-methylpyrrolidone and methylethylketone (MEK) comprising 20% by volume N-methylpyrrolidone. The polyimide was dried briefly at 240° C. and the process was repeated a sufficient number of times to produce, after curing, a first resin layer 250 microns thick in which the resin was polyimide. The coated plaque was then heated 2 hours at 240° C. and 2 hours at 315° C. to form the fully cured polyimide.

The first resin layer was spray-coated to a thickness of 38 microns with a suspension in the same EYMYD solution of 12% powdered nickel (NOVAMET Ni-255), having an irregular particle shape and a bulk density of about 0.5 g./cc. The polyimide in the suspension was cured under the same conditions employed in the previous curing step, to form a second layer.

The surface coated with the second layer was blasted with glass beads to expose nickel particles, and the residue was removed by spray rinsing with water. The plaque was then immersed in a commercial electroless nickel plating solution (Enthone ENPLATE 426) and plated for 30 minutes, after which it was water rinsed and dried at 110° C. for 16 hours. Finally, a 38-micron layer of copper was electroplated on the electroless nickel. It had a peel strength of 66.2 g./mm.

EXAMPLE 2

The procedure of Example 1 was repeated four times, with the addition of 10-minute treatments with four different surfactant solutions following glass bead blasting and rinsing, followed by a 10-minute water rinse. The peel strengths of the resulting plaques varied from 119.9 to 193.3 g./mm., demonstrating the advantage of surfactant treatment prior to electroless deposition.

EXAMPLE 3

The procedure of Example 2 was repeated, with the addition of the following steps of treatment with a catalyst for electroless deposition after the surfactant treatment and water rinse:
Shipley CATAPREP 404—1 minute;
Shipley CATAPOSIT 44—5 minutes;
Water rinse—4 minutes;
Shipley Accelerator 19—5 minutes;
Water rinse—5 minutes.
The peel strength for the resulting plaque was 252.4 g./mm., demonstrating the advantage of treatment with catalyst. Temperatures were selected in accordance with manufacturers recommendations.

EXAMPLES 4–8

The procedure of Example 1 was repeated, substituting for the "EYMYD" polyimide a polyamideimide precursor sold by Amoco under the tradename "TORLON", comprising structural units of the type resulting from the reaction of trimellitic anhydride with an aromatic diamine. The polyamideimide coating was cured for 2 hours at 288° C. after application. The second layer contained various nickel powders from Novamet Products Corp. suspended in the polyamideimide precursor solution at a weight ratio of nickel to resin of 2:1. The peel test results are given in Table I.

TABLE I

|  | Example | | | | |
| --- | --- | --- | --- | --- | --- |
|  | 4 | 5 | 6 | 7 | 8 |
| Ni powder: | | | | | |
| Product designation | Ni-255 | Ni-255AC | Ni-287 | HCA-1 | Ni-123 |
| Particle shape | Irreg. | Irreg. | Irreg. | Platelets | Spheres |
| Bulk density, g./cc. | 0.5 | 0.6 | 0.9 | 1.2 | 2.2 |
| Peel strength, g./mm. | 161.1 | 150.4 | 80.6 | 26.9 | 12.5 |

It is apparent that adhesion is improved to a substantially greater extent when the metal particles are non-spherical than when they are spherical, and also that the particles with irregular shapes and bulk densities in the range of about 0.4–1.0 g./cc. produced substantially better adhesion than the platelet-shaped or spherical particles having higher bulk densities.

Figure 6:
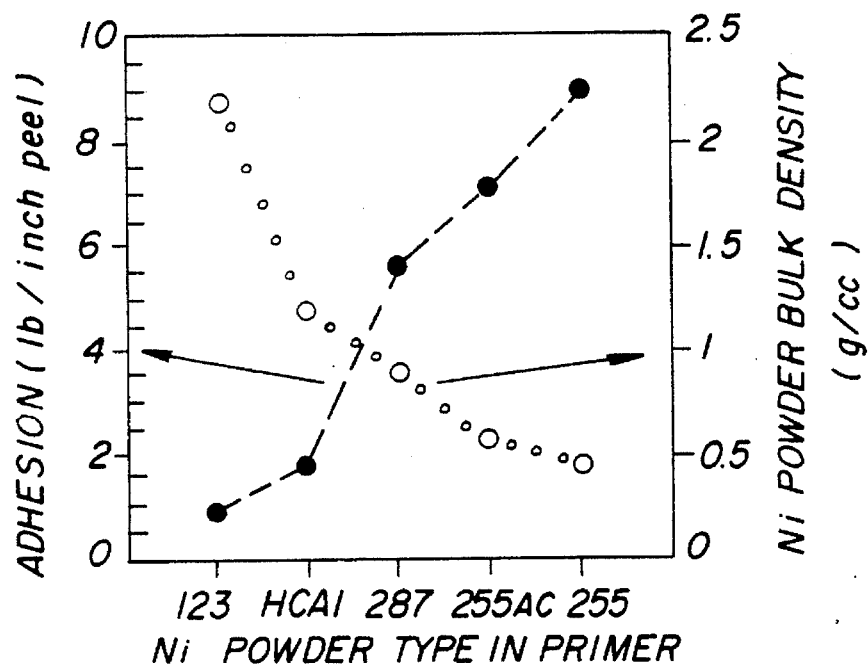
FIG. 6 is plot comparing the peel strength for various primers having different particle densities.

FIG. 6 is a plot contrasting adhesion (lb/in) peel strength with the density of the nickel powder in g./cc., for the different nickel powder primers in Table I. It is apparent that the lower density materials have better adhesion. This is thought to occur because the lower density materials appear to have higher porosity and hence more sites for mechanical bonding.

EXAMPLE 9

The procedure of Example 4 was repeated, varying the metal-to-resin ratio in the second layer. The results are given in Table II.

TABLE II

| Ratio, metal/resin | Peel strength, g./mm. |
| --- | --- |
| 1:2 | 39.4 |
| 1:1 | 60.9 |
| 2:1 | 159.3 |
| 4:1 | 84.1 |
| 8:1 | 25.1 |

The results in Table II show that superior adhesion is demonstrated when the ratio of metal to resin is in the range of about 1:1–4:1, and drops off significantly at ratios above 5:1.

EXAMPLE 10

The procedure of Example 7, employing the HCA-1 nickel powder in platelet form, was repeated except that the article coated was an injection molding insert and no electroless metal was deposited, the second layer being a 25–50 micron resin coating rich in nickel in platelet format the resin-contacting surface of the mold. The insert was used in an injection molding trial in which 50 samples of glass-filled bisphenol A polycarbonate resin were molded against the insert at an injection pressure of about 34.5 MPa. No evidence of abrasion of the mold surface was noted when the procedure was completed.

The injection pressure was then increased to 69 MPa. and 100 more samples were molded, again, the insert was inspected for wear and none was seen. Finally, the pressure was increased to 138 MPa. and an additional 100 samples were molded. The insert showed slight abrasion in the gate region but none elsewhere.

Similar tests were conducted at metal-to-resin ratios of 0.5–8.0:1. The best results were obtained at a ratio of 4:1.

Results similar to those described above were obtained with the following commercially available polyimides: "MATRIMID 5218" of Ciba-Geigy, based on 5-amino-1-(4'-aminophenyl)-1,3-trimethylindane; "P84" from Lenzing USA Corp., prepared from an aromatic diamine and bis-3, 4-dicarboxybenzophenone dianhydride; and "AVIMID-N" from DuPont, based on an aromatic diamine and 2,2-bis (3,4-dicarboxyphenyl) hexafluoropropane dianhydride.

The article molded by contact with the mold described herein has a resulting surface which may be characterized as finished, that is, having a Gardner gloss at 60° greater than about 85, determined in accordance with ASTM Standard Test Method for Specular Gloss Designation D523-89, and a mean average roughness $R_a$ of less than about 0.1–0.2 micrometers (i.e., the arithmetic average height of roughness irregularities measured from a mean line which is within an evaluation length L). Other measurements which are used to characterize surface quality are: maximum roughness depth (per DIN) $R_{max}$, which is the largest of the five (5) maximum peak-to-valley roughness depths in five (5) successive sampling lengths; and mean roughness depth $R_2$ (per DIN)—also known as $R_{TM}$—which is the mean of five (5) maximum peak-to-valley roughness depths in five (5) successive sampling lengths. The measurement accuracy may be characterized by ANSI-B46.1; ISO; DIN or MIL specifications. Such a surface needs no further finishing and may conveniently referred to as a class "A" finish. Such a finish is aesthetic. Thus, while the measured gloss and roughness are desirable characteristics to be achieved, human evaluation may prevail as to the acceptability of such a surface.

Table III is a comparative showing of the average roughness $R_a$ and Gardner gloss at 60° for various polymer materials A–M having different filler contents. The materials are named chemically in the letter designation. The filler content in weight percent follows the respective letter designation. The various materials, with the exception of the PBT/PET blend had better average roughness and Gardner gloss.

TABLE III

| | Injection Molding | | | |
|---|---|---|---|---|
| | Ra Average Roughness (micrometers) | | Gloss (60 Degrees) | |
| Material | Per Invention | Conventional | Per Invention | Conventional |
| A/10% glass fiber | 0.04 | 0.64 | 95 | 34 |
| B/20% glass fiber | 0.04 | 0.92 | 101 | 32 |
| C/30% glass fiber | 0.05 | 0.9 | 102 | 35 |
| D/50% glass fiber | 0.19 | 1.7 | 92 | 9 |
| E/50% fillers (30% glass fiber 20% filler (mica) and ground glass) | 0.2 | 1.6 | 94 | 9 |
| F/20% glass fiber | 0.51 | 0.85 | 51 | 15 |
| G/20% fillers 20% glass fiber 10% fillers (mica) and ground glass) | 0.25 | 0.55 | 66 | 14 |
| H/30% fillers (25% glass fiber 15% fillers (mica) and ground glass) | 0.06 | 1.95 | 99 | 10 |
| I/40% glass fiber | 0.1 | 2.4 | 96 | 7 |
| J/30% glass fiber | 2.4 | 2.7 | 15 | 3.5 |
| K/0% filler | 0.07 | 0.25 | 68 | 8.2 |
| L/30% glass fiber | 0.29 | 0.25 | 79 | 82 |
| M/65% BaSO$_4$ | 0.09 | 0.15 | 65 | 60 |

Figure 7A:
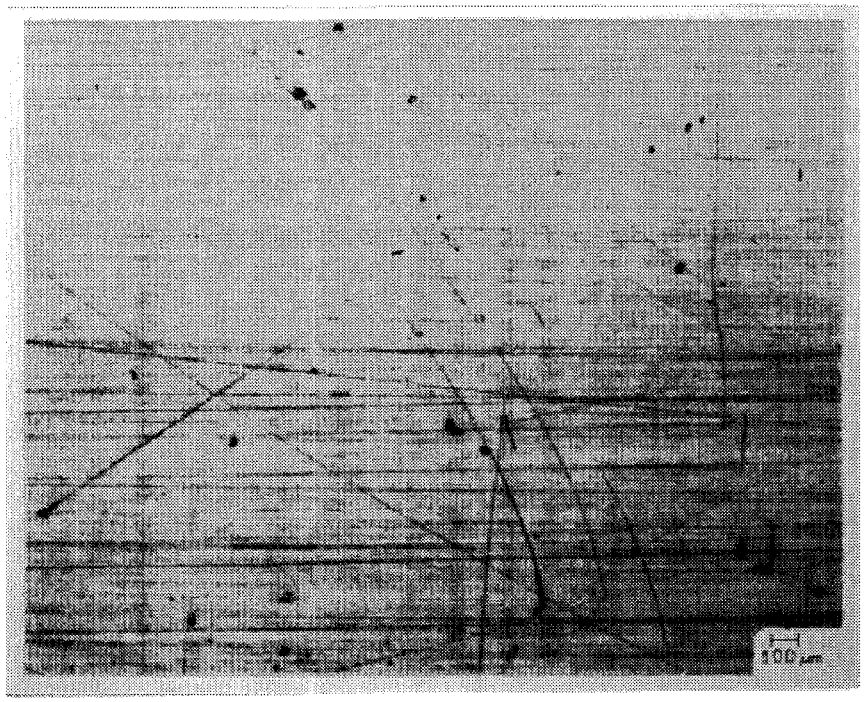
FIG. 7A is a top view of a finished surface of an article utilizing a mold manufactured in accordance with the present invention.
Figure 7B:
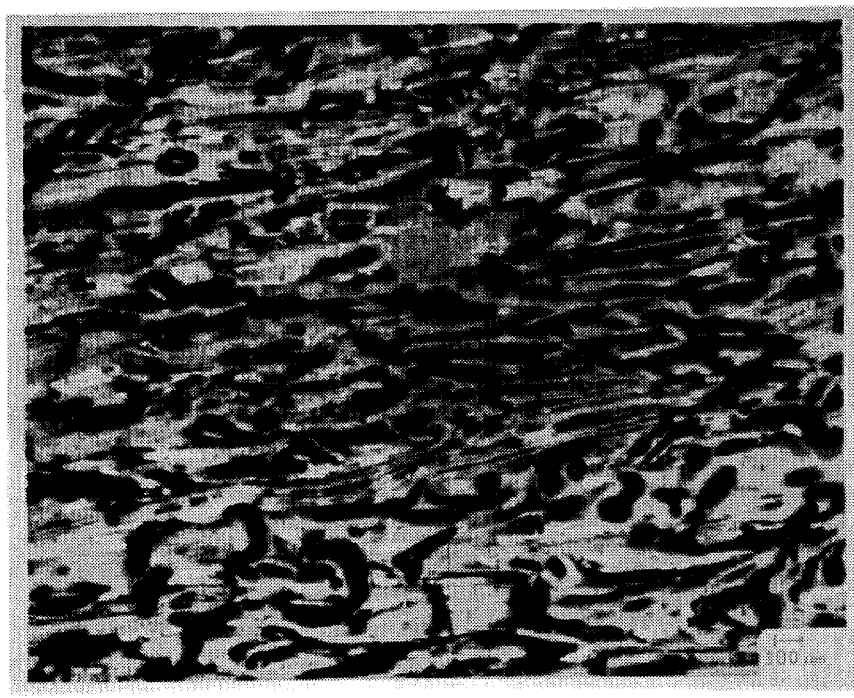
FIG. 7B is a top view of an article surface molded in accordance with conventional practice.

A–C Poly (Bisphenol-A carbonate)
D Co Poly (Bispheno-A/TETRA bromobisphenol-A carbonate)/poly (bispheol-A carbonate
E Polycarbonate
F Polyamide
G Polypropylene
H–I Polyphenylene oxide/polystyrene blend
J–K Polyphenylene oxide/polyamide polymer blend
L PET/PBT blend
M PBT FIGS. 7A and 7B are photomicrographs respectively showing the surface quality of an injection molded article manufactured using the molding surface in accordance with the invention and an article manufactured in accordance with conventional injection molding techniques. The article is a polycarbonate filled with 10% glass fibers. The surface FIG. 7A is clearly superior in the smoothness and surface texture in comparison to the surface in FIG. 7B.

Figure 8A:
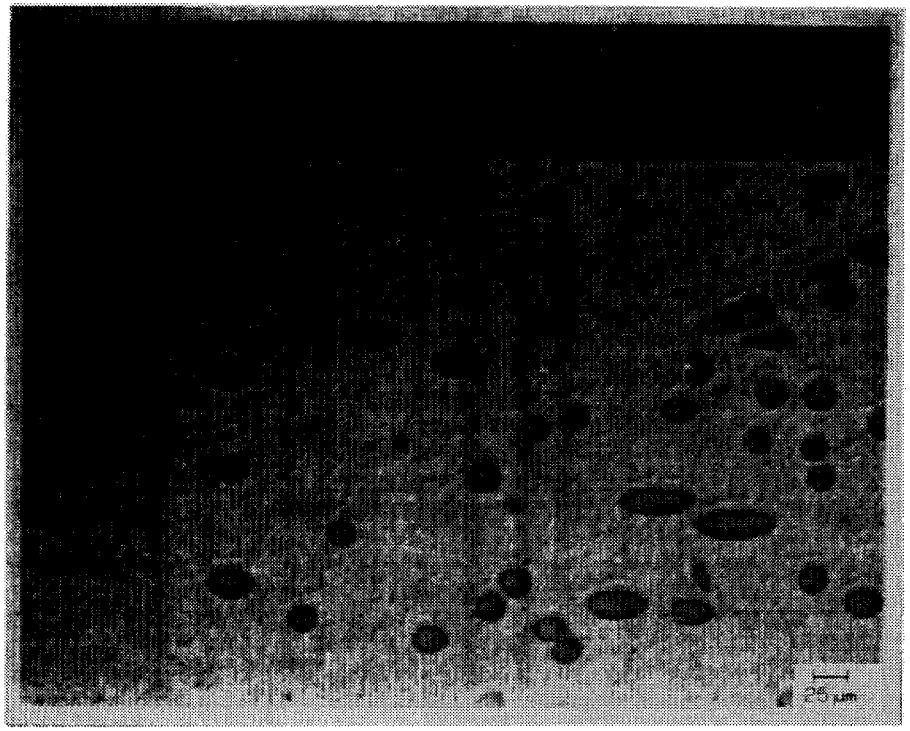
FIG. 8A is a cross-section of the article shown in FIG. 7A.
Figure 8B:
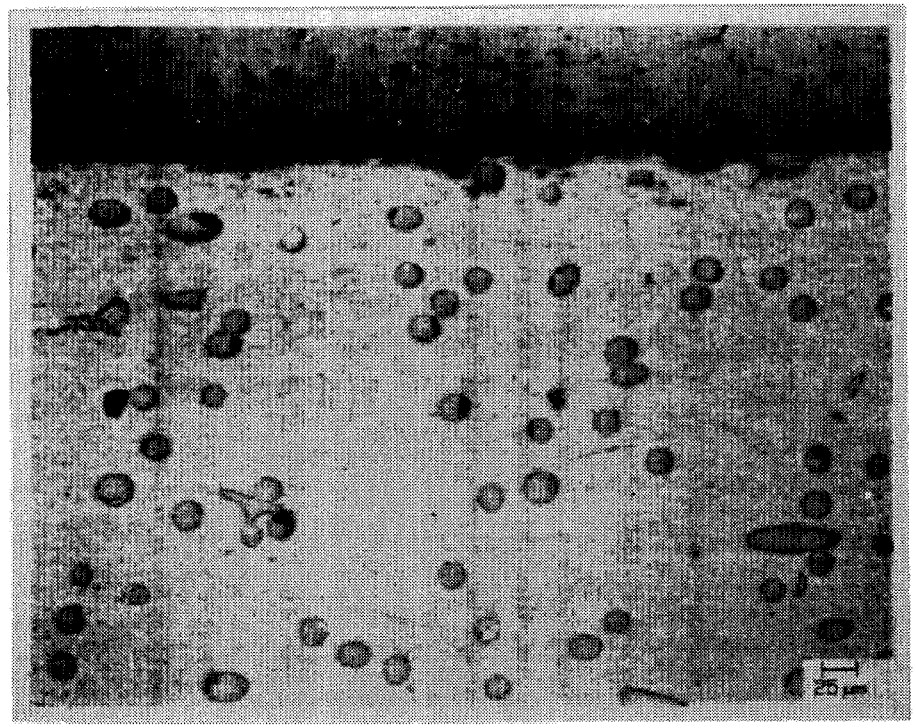
FIG. 8B is a cross-section of the article shown in FIG. 7B.

FIGS. 8A and 8B are photomicrographs of cross-sections of the surfaces in FIGS. 7A and 7B respectively. The surface in FIG. 8A is clearly much more smooth and uniform than the surface in FIG. 8B under the magnifications shown.

According to the invention, various thermoplastic materials may be employed with the mold to produce finished products. Such plastics include polyamide materials sold under the trade designation "Nylon 6" or "Nylon 12" or "Nylon 6,6"; and other polymers such as polyesters, such as poly (butylene terephthalate) (PBT), poly (ethylene terephthalate) (PET), and PBT with soft ether linkages formed of polycarbonate and methylene, polyether ketones, polyetherimides, polylactams, polypropylenes, polyethylenes, polystyrene (PS), styrene acrylonitrile, acrylonitrile butadiene terpolymers, polyphenylene oxide (PPO)/polystyrene and PPO/nylon and high impact styrenes filled or unfilled and blends thereof. Materials particularly suited for use in the invention, because of their versatility, strength and appearance include filled or unfilled polycarbonates, polyesters, polyphenylene oxide, acrylonitrile butidiene styrene (ABS), polyimide and polymeric combinations of such materials.

In addition to the foregoing, the following patents, the teachings of which are incorporated herein by reference disclose materials particularly useful for molding optical media such as optical disks and compact disks, and business machine parts which require optimum surface properties: Mille, U.S. Pat. Nos. 4,774,315 and 4,788,275; Okamuto, U.S. Pat. No. 4,997,903, Okamuto et al., U.S. Pat. Nos. 4,977,233 and 4,902,735; Hasuo et al., U.S. Pat. No. 4,734,488; Myiauchi, U.S. Pat. No. 4,670,479 and Japanese Patent J62207-358-A. These references disclose various materials having an average molecular weight within the range from about 10,000 and about 18,000 suitable for the molding applications herein discussed as well as other applications of interest to those skilled in the art.

Figure 9A:
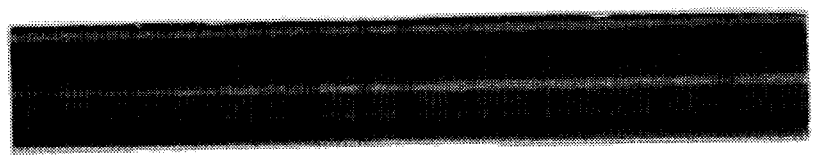
FIG. 9A is a photograph of the cross-section under polarized illumination of an injection molded article using the principles of the present invention.
Figure 9B:
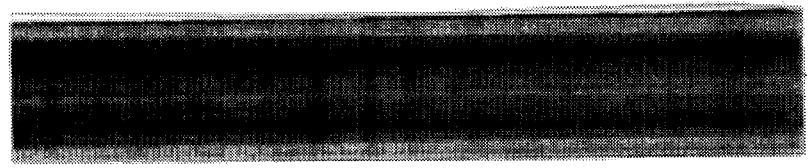
FIG. 9B is a comparative photograph of the cross-section under polarized illumination of an article made by conventional injection molding.

FIGS. 9A and 9B are comparative photographs using polarized light to illustrate birefringence in molded articles. In FIG. 9A an article manufactured by an injection molding technique according to the invention is shown. In FIG. 9B an article molded by a conventional technique is shown. The spaced apart lines represent the birefringence in the articles. Note how the conventionally molded article has irregular and closely spaced lines indicating high nonuniform stress, while the article made in accordance with the present invention has a uniformly spaced and spread apart lines indicating a lower more uniform stress characteristic. The invention, by providing reheating during the injection molding step allows the stresses induced in the article caused by the molding process to anneal and become relieved. In optical articles, for example optical disks and the like, the optical properties are improved as a result of the more uniform and stable birefringence.

The process according to the present invention is directed to the use of a mold as described herein for making articles. In particular, the mold may be employed in an injection molding or injection compression molding process where molten thermoplastic material is injected into a mold cavity. The molten material spreads throughout the cavity and is held therein for a time sufficient to cool below the glass transition temperature after which the molded article is ejected. In compression/injection molding, the molten thermoplastic material is compressed after the injection step. The invention results in molded articles having less severe and more uniform birefringence, less stress, a smoother surface finish and better optical properties.

Figure 10:
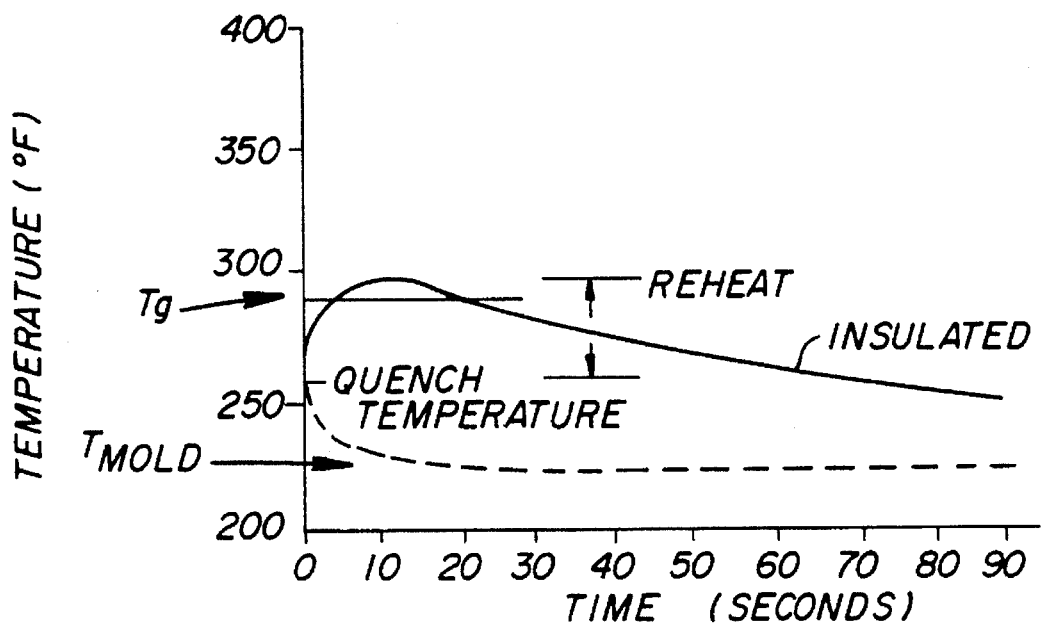
FIG. 10 is a comparative plot schematically showing the time temperature relationship of a thermoplastic material relative to the glass transition temperature $T_g$ in a conventional mold and in a mold according to the present invention.

FIG. 10 schematically shows the transient temperature response of the surface temperature of an article molded in accordance with the teachings of the present invention, in comparison to the temperature profile of an article manufactured by conventional processes. In conventional molding represented by the dotted line the thermoplastic material at time t=0 initially comes in contact with the mold surface. As can be seen, the thermoplastic material in conventional apparatus, without insulation, is immediately cooled below the glass transition temperature $T_g$. Such rapid cooling can cause rough surfaces in the finished article. On the other hand, with the insulated mold structure of the present invention, the thermoplastic material can be initially quenched by contact with the relatively cool skin of the mold and may temporally fall below the glass temperature $T_g$. However, the surface becomes reheated by the internal temperature of the hot molten thermoplastic material. Thus, the surface temperature increases to above the glass transition temperature, and the resin fills the mold thereby avoiding rough surfaces.

In conventional molding techniques as the melt front moves between the mold surfaces, the molten thermoplastic material solidifies thereby constricting the flow path of the material within the mold. This limits the flow length to some nominal distance. On the other hand, the insulated mold structure of the present invention reduces or eliminates the solidification of the molten thermoplastic material against the mold surfaces whereby the flow path is relatively unrestricted and the flow length is substantially increased. In an injection molding apparatus the increase in flow length has been found to be about 5 to about 17 percent depending on the wall thickness. Using the teachings of the invention, for example, a 0.1 inch article manufactured from a polycarbonate filled with 10 percent glass had a 6 percent increase in flow length. A same material formed to a wall thickness of 0.08 inches had a 10 percent flow increase over conventional methods. An article molded to a thickness of 0.06 inches had about 17 percent increase in flow length over conventional molding techniques. Thus, it can be seen that the present invention is especially suited for injection molding and injection compression molding where thin wall structures are desired.

Figure 11:
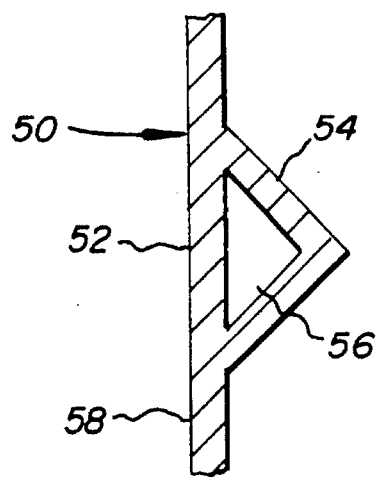
FIG. 11 is a fragmentary side sectional elevation of an exemplary finished part formed by gas assist.

The invention also comprises a method for manufacturing molded articles or parts having one or more finished surfaces. According to the invention, the method comprises charging, injecting or placing a plastic into a mold having a structure described hereinabove. The mold may be a compression or transfer mold apparatus or may be a high or low pressure injection molding apparatus. Such molding apparatus may employ a so-called cold runner or a hot runner in the feed. The apparatus may also employ a gas assist to implement the process. Gas assist known to those skilled in the art is especially useful in molding strengthened articles. For example, FIG. 11, a strengthened panel 50 has a wall 52 of substantially uniform thickness and a hollow strengthening rib 54. The rib 54 is formed with a hollow channel 56 to reduce large concentrations of thermoplastic material, such that, surface irregularities due to differential shrinkage are not manifested in the finished surface 58 of the article.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. A multilayer mold for molding a thermoplastic resin comprising:
    a metal substrate selected from iron, steel, stainless steel, aluminum or brass;
    a first layer of a polymeric resin selected from polyimides, polyamideimides, polyamides, polysulfone, polyethersulfone, polytetrafluoroethylene or polyetherketone, each of which may be filled or unfilled, deposited on said metal substrate,
    a second layer deposited on said first layer comprising a porous matrix of metal particles in platelet form and having a bulk density in the range of about 1.1–1.5 g/cc in a polymeric resin selected from polyimides, polyamideimides, polyamides, polysulfone, polyethersulfone, polytetrafluoroethylene or polyetherketone, wherein the ratio of metal to resin in the second layer is in the range of 0.5–5.0:1 by weight.

2. A mold according to claim 1 wherein the metal particles are non-spherical.

3. A mold according to claim 1 wherein polymeric resin in the first resin layer is a polyimide or polyamideimide.

4. A mold according to claim 1 wherein the metal particles are nickel.

5. A mold according to claim 1 wherein the thickness of the first layer is in the range of about 10–500 microns.

6. A mold according to claim 1 wherein the thickness of the second layer is in the range of about 10–100 microns.

7. A mold according to claim 1 which has a further metal coating deposited on said second layer.

8. An mold according to claim 1 wherein the weight ratio of the metal particles to polymeric resin in the second layer is in the range of about 1–4:1.

9. A multilayer mold for molding a thermoplastic resin into finished parts, comprising:
    a metal core;
    an insulating layer of polymeric resin selected from polyimides, polyamideimides, polyamides, polysulfone, polyethersulfone, polytetrafluoroethylene or polyetherketone, each of which may be filled or unfilled deposited on said core; and
    a metal-containing primer layer comprising a porous matrix of non-spherical metal particles in platelet form and having a bulk density in the range of about 1.1–1.5 g/cc in a polymeric resin selected from polyimides, polyamideimides, polyamides, polysulfone, polyethersulfone, polytetrafluoroethylene or polyetherketone, deposited on said insulating layer wherein the ratio of metal to resin in the primer layer is in the range of 0.5–5.0:1 by weight.

10. A mold according to claim 9 wherein the polymer is a polyimide or polyamideimide.

11. A mold according to claim 9 wherein the metal particles are nickel.

12. A mold according to claim 9 which has a further metal coating deposited on said metal-containing layer.

13. A mold according to claim 12 wherein the weight ratio of metal to polymer in the metal-containing layer is in the range of about 1–4:1.

* * * * *